Aug. 4, 1936.   J. B. WALSH   2,050,137
PLUMBER'S UNION AND METHOD OF MANUFACTURE THEREOF
Filed Dec. 23, 1933   2 Sheets-Sheet 2
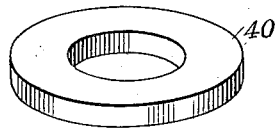
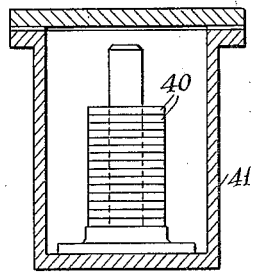
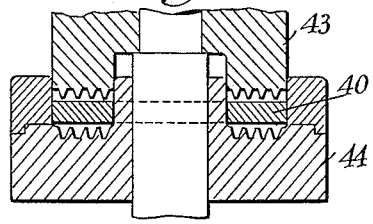
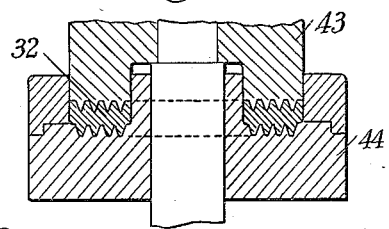
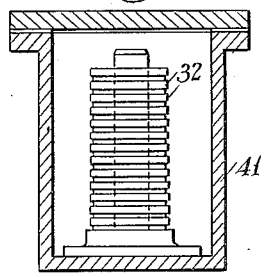
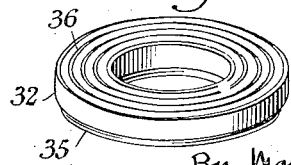
INVENTOR:
John B. Walsh
By Morrison, Kennedy & Campbell
ATTORNEYS.

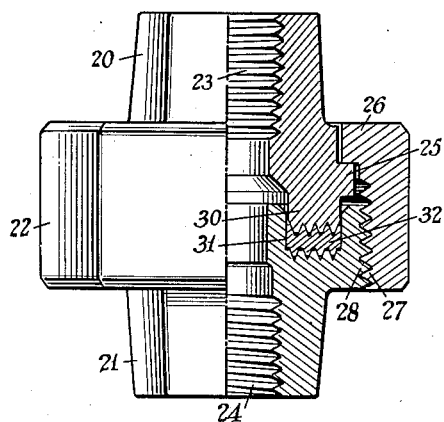
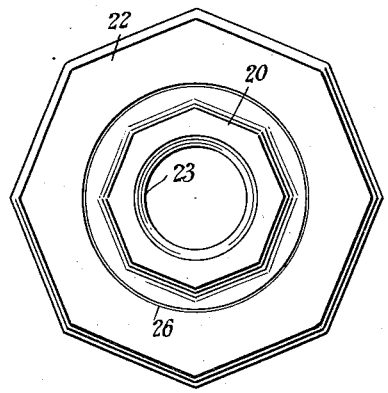
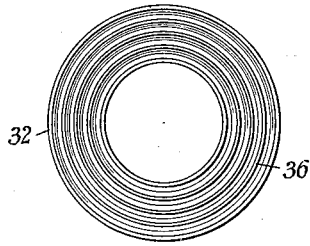
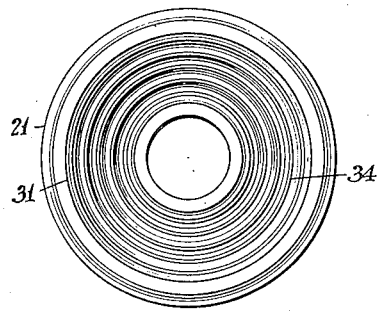
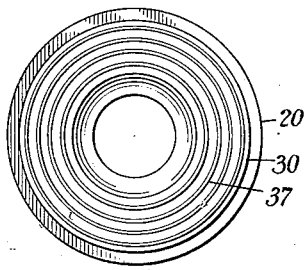
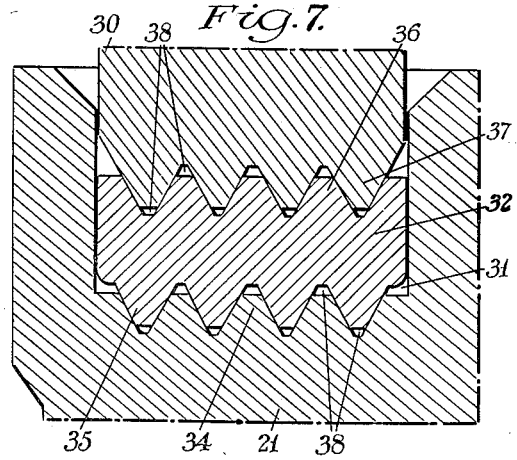

Patented Aug. 4, 1936

2,050,137

UNITED STATES PATENT OFFICE 2,050,137

PLUMBER'S UNION AND METHOD OF MANUFACTURE THEREOF

John B. Walsh, Brooklyn, N. Y., assignor to United Superior Union Company, Inc., a corporation of New York Application December 23, 1933, Serial No. 703,697

1 Claim. (Cl. 285—120)

This invention is a novel plumber's union and method of manufacture thereof; having particular reference to a union or pipe coupling of the type comprising the opposed union members, male and female, with a coupling member or nut for drawing them forcibly together. Such unions are commonly employed for coupling pipes carrying steam, water, gas or other fluids.

A typical example of such plumber's union or pipe coupling is that shown in the Smith and Bemies prior United States Patents 1,880,115 of September 27, 1932 and 1,906,826 of May 2, 1933 covering respectively a method of manufacture and a pipe coupling or union.

The general object of the present invention is to improve known plumber's unions, especially by rendering them more efficient in the sealing of the coupling in a fluid-tight manner, adapting them for conducting fluids under high pressure or high temperature or both. A particular object is to improve the sealing effect by a novel construction of the elements which mutually contact in forming the sealing engagement. A further object is to improve the method of manufacture of plumber's unions of the type referred to.

Other and further objects and advantages of the present invention will be explained in the hereinafter following description of an illustrative embodiment thereof or will be manifest to those conversant with the subject. To the attainment of such objects and advantages the present invention consists in the novel plumber's union, and the novel features of method, operation, combination and construction herein illustrated or described.

In the accompanying drawings Figure 1 is a mixed view, the left half being a side elevation, and the right half being a radial vertical section, of a plumber's union embodying the principles of the present invention.

Fig. 2 is a top plan view of the union shown in Fig. 1.

Fig. 3 is a top view of the lower or female member detached.

Fig. 4 is a complementary or bottom view of the male member detached.

Fig. 5 is a top plan view of the packing ring detached.

Fig. 6 is a mixed view of the packing ring, the left side being in elevation, and the right side in radial vertical section.

Fig. 7 on an enlarged scale, in vertical radial section, shows the construction and relation of the male and female members and packing ring at the sealing point.

Fig. 8 is the first of a series of diagrammatic views showing the preferred steps in the method of manufacture of the union in Figs. 1 to 7, Fig. 8 showing in perspective the blank or ring from which the packing ring is to be formed.

Fig. 9 shows diagrammatically a number of packing ring blanks being subjected to annealing to soften them preparatory to the forming thereof.

Fig. 10, in central cross section, shows diagrammatically the packing ring blank enclosed between forming or stamping dies.

Fig. 11 is similar to Fig. 10 showing the later stage after the dies have compressed the blank to its final form.

Fig. 12 in diagrammatic elevation shows the preferred step of supplemental annealing of a number of the stamped or formed packing rings.

Fig. 13, in perspective, shows the completed packing ring detached and ready to be inserted in its place as indicated in Figs. 1 and 7.

The union hereof is shown as composed of a male member 20 engaging with a female member 21, these being adapted to be forcibly drawn together into sealing engagement by a suitable coupling means, which might consist of outstanding flanges with a series of connecting bolts, but for convenience is shown as a threaded coupling member or nut 22. The male member 20 is internally threaded at 23 for attaching to a pipe, and the female member is similarly internally threaded at 24. The male member has an outwardly extending flange 25 and this is shown engaged by the inwardly extending flange 26 of the coupling nut 22. The coupling nut is formed with an interior thread 27 engaging the exterior thread 28 of the female member 21. As indicated in Fig. 2 the periphery of the coupling nut and as well the exposed portions of the male and female members may be formed with octagonal or other contour to facilitate the use of wrenches thereon.

In the type of union herein illustrated the male union member 20 has a longitudinal annular projection 30 adapted to extend into an annular channel 31 in the female member. In the bottom of the channel 31 is shown a packing ring 32, which may be preformed of the construction shown and is preferably tightly anchored or press-fitted into place at the bottom of the channel during manufacture to constitute a permanent part of the female member.

A feature of this invention is the formation of the essential sealing parts with annular V-shape ridges, enclosing flared grooves between them, the ridges however being truncated or terminating short of their apexes. Thus at the bottom of the annular channel 31 is shown a series of truncated concentric ridges 34. Engaging in the grooves between the ridges 34 are the concentric truncated V-ridges 35 at the inner or bottom face of the packing ring. Similarly, at the top or outer side of the packing ring is a series of concentric truncated V-ridges 36, while the extremity of the male member projection 30 is formed with a corresponding annular series of truncated ridges 37 engaging the grooves between the ridges 36.

By reason of the truncated form of the several V-ridges described there are distinct gaps 38 formed at the apexes of the several grooves. This construction greatly improves the sealing action, as will be described, and additionally avoids the necessity of machining the several grooves to extend completely to an angular apex. It is especially important for the engagement of the male member with the packing ring, which engagement is made in practical use, but is also valuable for the permanent engagement between the ring and female member.

The male and female members are preferably made of very hard metal such as cast iron and the coupling member 22 may be of the same material. These members are machined accurately to form especially as to the channel 31 in the female member and the described ridges and grooves at the bottom of the channel and at the end of the male projection 30. The packing ring 32 is accurately preformed with complementary grooves and ridges, but this element is composed of a metal softer than cast iron, such as copper or brass, being a relatively hard metal, and adapted to withstand high temperatures, but having a yield point somewhat lower than that of the metal composing the union members, so that in the act of sealing the union by means of the coupling member the metal of the packing ring may yield or flow sufficiently to adapt itself and permit a very complete and tight sealing engagement as indicated in Fig. 7.

By reason of the truncated character of each of the engaging ridges of the male and female members and the packing ring between them a highly efficient and fluid tight engagement and sealing is afforded. There being no apexes to the ridges the engaging movement is not terminated by such apexes reaching the bottoms of the complementary grooves. Therefore a wedging action occurs and substantially the entire sides of the respective ridges are utilized for the sealing engagement, which is not impaired by some small foreign matter in the gaps beyond the ridge apexes.

Thus in the particular instance shown there are substantially eight sealing surfaces, all of complementary wedging character, between the female member and the packing ring, and the same between the packing ring and the male member, thus completing the coupling of the pipes to which the union members are preattached. Any fluid leakage must pass in series all eight surfaces, each an efficient wedging seal. The several sealing surfaces are concentric and are therefore readily machined to accurate form, and the construction is such that the sealing effect is not impaired after one or more sealing operations in practical use, and the union hereof can be repeatedly disconnected and connected, without loss of sealing efficiency. It will be noted that the annular projection 30 of the male member enters the channel 31 of the female member with a somewhat loose fit but such as to guide accurately the ridges of the projection into the grooves of the packing ring.

The preferred method of manufacture of the described article is as follows. The packing ring may be formed from a blank 40 shown in Fig. 8, being in the form of a simple annulus machined to exact size and composed of copper, copper alloy, or other high temperature resisting metal that is somewhat softer than the union members. In Fig. 9 is indicated an annealing chamber 41, in which a number of annular blanks 40 are placed to anneal and soften them by usual annealing methods.

Each blank is then subjected to high pressure or stamping action to form or shape it with truncated V-shape ridges and grooves as described. Thus in Fig. 10 is shown a male forming die 43, and therebeneath a channeled or female die 44, which may be constructed in two parts for subsequent disassembly and removal of the formed ring. The male and female die parts have a formation complementary to that of the finished ring, namely with a series of concentric truncated grooves, so that the resulting ridges will be correspondingly truncated. Fig. 11 shows the completion of the forming action which may be performed in a hydraulic or other power press. This die forming action tends to harden considerably the packing ring 32 and the ring is thereafter subjected to a supplemental annealing operation, a number of such rings being shown in Fig. 12 as assembled in the annealing chamber 41. The completed annealed packing ring is shown in perspective in Fig. 13.

The ring is now ready to be inserted in the channel of the female member. The ring should be press-fitted into the channel, preferably being of tight fit and requiring to be forced home under heavy pressure, for example in a press, by means of the male die 43, so that the ring becomes anchored as a permanent part of the female union member. The union members having been previously machined to exact form the union is now completed and in readiness for practical use.

There have thus been described a plumber's union and a method of manufacture thereof embodying the principles of the present invention; but since many matters of method, operation, combination and construction may be variously modified without departing from the principles of the invention it is not intended to limit the same to such matters except so far as set forth in the appended claim.

What is claimed is:

As an article of manufacture a plumber's union comprising male and female union members of hard metal, as iron, and coupling means to draw them together, the female member having an annular channel of substantial depth and with multiple concentric V-ridges formed at the bottom thereof, and a preformed packing ring composed of a metal, as copper, which is somewhat softer than the union members but sufficiently hard to resist substantial flow or distortion under coupling pressure, said packing ring having multiple preformed concentric V-ridges at its inner and outer faces and being press fitted in the bottom of said channel with its inner ridges in fluid-tight sealing engagement between the channel ridges, the male member having a longitudinal annular projection adapted to enter the annular channel of the female member and formed with multiple concentric V-ridges at its end face adapted to make a fluid-tight sealing engagement between the ridges at the outer face of the softer metal packing ring; the V-ridges of the union members and of the softer but non-flowing metal packing ring being truncated to an extent not less than about one fifth of the full height of the ridges thereby to leave permanent gaps of substantial size at the apexes thereof, whereby the coupling pressure causes an effective wedging action between the sides of the opposing ridges at their thicker portions and consequent extensive multiple fluid-tight sealing engagement, between each of the union members and the sealing ring without the application of sealing compound therebetween, and without appreciable distortion, so that the parts retain substantially their original form and are adapted to repeated uncoupling and recoupling.

JOHN B. WALSH.